US009022313B2

(12) United States Patent
Sonneborn

(10) Patent No.: US 9,022,313 B2
(45) Date of Patent: May 5, 2015

(54) ROTOR UNLOADING APPARATUS AND METHOD

(75) Inventor: David Gerd Oskar Sonneborn, Colleyville, TX (US)

(73) Assignee: Groen Brothers Aviation, Inc., Salt Lake City, UT (US)

( * ) Notice: Subject to any disclaimer, the term of this patent is extended or adjusted under 35 U.S.C. 154(b) by 487 days.

(21) Appl. No.: 13/335,541

(22) Filed: Dec. 22, 2011

(65) Prior Publication Data

US 2012/0168568 A1 Jul. 5, 2012

Related U.S. Application Data

(63) Continuation-in-part of application No. 13/199,679, filed on Sep. 7, 2011, now Pat. No. 8,668,162, and a continuation-in-part of application No. 13/199,677, filed on Sep. 7, 2011, now Pat. No. 8,939,394.

(60) Provisional application No. 61/403,136, filed on Sep. 9, 2010, provisional application No. 61/381,347, filed on Sep. 9, 2010, provisional application No. 61/429,289, filed on Jan. 3, 2011, provisional application No. 61/499,996, filed on Jun. 22, 2011, provisional application No. 61/429,282, filed on Jan. 3, 2011.

(51) Int. Cl.
| | | |
|---|---|---|
| *B64C 27/02* | (2006.01) | |
| *B64C 27/18* | (2006.01) | |
| *B64C 27/26* | (2006.01) | |
| *B64C 27/30* | (2006.01) | |

(52) U.S. Cl.
CPC .............. *B64C 27/025* (2013.01); *B64C 27/18* (2013.01); *B64C 27/26* (2013.01); *B64C 27/30* (2013.01)

(58) Field of Classification Search
USPC ....................... 244/6, 7 R, 8, 17.11
See application file for complete search history.

(56) References Cited

U.S. PATENT DOCUMENTS

| | | | | |
|---|---|---|---|---|
| 2,601,463 A | | 6/1952 | Stanley | |
| 3,155,341 A | * | 11/1964 | Girard | ........................ 244/7 R |
| 3,241,791 A | * | 3/1966 | Piasecki | .................... 244/17.19 |
| 3,494,424 A | | 2/1970 | Stanley | |
| 3,900,176 A | * | 8/1975 | Everett | ............................ 244/6 |
| 4,589,611 A | | 5/1986 | Ramme et al. | |
| 4,979,698 A | * | 12/1990 | Lederman | ..................... 244/7 R |
| 5,131,603 A | * | 7/1992 | Meyers | ...................... 244/17.19 |

(Continued)

OTHER PUBLICATIONS

Franklin D. Harris, An Overview of Autogyros and the McDonnell XV-1 Convertiplane, NASA/CR, Oct. 2003.

(Continued)

*Primary Examiner* — Joseph W Sanderson
(74) *Attorney, Agent, or Firm* — Pate Baird, PLLC

(57) ABSTRACT

A method and apparatus for enabling high speed flight in a rotorcraft are disclosed. The method may include executing a flight with a rotorcraft. The flight may include a first portion and second portion ordered sequentially. During the first portion, the rotorcraft may be flown with the rotor exclusively in autorotation. Once sufficient airspeed is obtained, the flight may transition to the second portion. Wherein, substantially all of the weight of the rotorcraft may be supported by one or more fixed wing surfaces of the rotorcraft. Thus, during the second portion, the rotor may be completely unloaded. To keep the rotor stable by turning, the rotor may be powered during the second portion by an engine of the rotorcraft by way of a prerotation system.

20 Claims, 9 Drawing Sheets

(56) References Cited

U.S. PATENT DOCUMENTS

| | | | |
|---|---|---|---|
| 5,544,844 A * | 8/1996 | Groen et al. | 244/8 |
| 5,727,754 A * | 3/1998 | Carter, Jr. | 244/8 |
| 5,934,873 A | 8/1999 | Greene | |
| 6,435,453 B1 * | 8/2002 | Carter, Jr. | 244/8 |
| 6,513,752 B2 * | 2/2003 | Carter, Jr. | 244/8 |
| 7,147,182 B1 | 12/2006 | Flanigan | |
| 7,448,571 B1 * | 11/2008 | Carter et al. | 244/17.25 |
| 8,376,264 B1 * | 2/2013 | Hong et al. | 244/7 A |
| 8,403,255 B2 * | 3/2013 | Piasecki | 244/6 |
| 2002/0005455 A1 * | 1/2002 | Carter, Jr. | 244/8 |
| 2002/0011539 A1 * | 1/2002 | Carter, Jr. | 244/6 |
| 2005/0151001 A1 * | 7/2005 | Loper | 244/6 |
| 2011/0036954 A1 * | 2/2011 | Piasecki | 244/7 A |
| 2012/0168556 A1 * | 7/2012 | Sonneborn | 244/17.23 |

OTHER PUBLICATIONS

David H. Hickey, NACA Research Memorandum, Full-Scale Wind-Tunnel Tests, National Advisory Committee for Aeronautics, May 17, 1956.

S. Coham et al, XV-9A Hot Cycle Research Aircraft Program Summary Report, U.S. Army Aviation Material Laboratories, Fort Eustis, Virginia, Jun. 1966.

G. Warren Hall et al., Flight Testing the Fixed-Wing Configuration of the Rotor Systems Research Aircraft, NASA, Jun. 1985.

S. Coham et al., XV-9A Hot Cycle Research Aircraft Program Summary Report, U.S. Army Aviation Material Laboratories, Fort Eustis, Virginia, Jun. 1966.

Franklin D. Harris et al., The XV-1's Rotor System, AHS International, Jan. 21-24, 2004.

* cited by examiner

ROTOR UNLOADING APPARATUS AND METHOD

RELATED APPLICATIONS

This application: is a continuation-in-part U.S. application Ser. No. 13/199,679 now U.S. Pat. No. 8,668,162, issued on Mar. 11, 2014, which claims the benefit of U.S. Provisional Patent Application Ser. No. 61/403,136, filed on Sep. 9, 2010; is a continuation-in-part of U.S. application Ser. No. 13/199,677 now U.S. Pat. No. 8,939,394, issued on Jan. 27, 2015, which claims the benefit of U.S. Provisional Patent Application Ser. No. 61/381,347, filed on Sep. 9, 2010; claims the benefit of U.S. Provisional Patent Application Ser. No. 61/429,289, filed on Jan. 3, 2011; claims the benefit of U.S. Provisional Patent Application Ser. No. 61/499,996, filed on Jun. 22, 2011; and claims the benefit of U.S. Provisional Patent Application Ser. No. 61/429,282, filed on Jan. 3, 2011; all of which are hereby incorporated by reference in their entirety.

Additionally, this patent application hereby incorporates by reference U.S. Pat. No. 5,301,900 issued Apr. 12, 1994 to Green et al., U.S. Pat. No. 1,947,901 issued Feb. 20, 1934 to J. De la Cierva, and U.S. Pat. No. 2,352,342 issued Jun. 27, 1944 to H. F. Pitcairn.

BACKGROUND

1. The Field of the Invention

This invention relates to rotating wing aircraft (rotorcraft), and, more particularly to rotorcraft relying on autorotation of a rotor to provide lift.

2. The Background Art

Rotorcraft rely on a rotating wing to provide lift. In contrast, fixed-wing aircraft rely on air flow over a fixed wing to provide lift. Fixed-wing aircraft must therefore achieve a minimum ground velocity on takeoff before the lift on the wing is sufficient to overcome the weight of the plane. Fixed-wing aircraft therefore generally require a long runway along which to accelerate to achieve this minimum velocity and takeoff.

In contrast, rotorcraft can take off and land vertically or along short runways inasmuch as powered rotation of the rotating wing provides the needed lift. This makes rotorcraft particularly useful for landing in urban locations or undeveloped areas without a proper runway.

The most common rotorcraft in use today are helicopters. A helicopter typically includes an airframe, housing an engine and passenger compartment, and a rotor, driven by the engine, to provide lift. Forced rotation of the rotor causes a reactive torque on the airframe. Accordingly, conventional helicopters require either two counter rotating rotors or a tail rotor in order to counteract this reactive torque.

Another type of rotorcraft is the autogyro. An autogyro aircraft derives lift from an unpowered, freely rotating rotor comprising two or more rotor blades. The energy to rotate the rotor results from a windmill-like effect of air passing through the underside of the rotor (i.e., autorotation of the rotor). The Bernoulli effect of the airflow moving over the rotor blade surface creates lift. The forward movement of the aircraft comes in response to a thrusting engine such as a motor driven propeller mounted fore or aft.

During the early years of aviation, autogyro aircraft were proposed to avoid the problem of aircraft stalling in flight and to reduce the need for runways. In autogyro aircraft, the relative airspeed of the rotor blades may be controlled or influenced somewhat independent of the forward airspeed of the autogyro, allowing slow ground speed for takeoff and landing, and safety in slow-speed flight.

Various autogyro devices in the past have provided some means to begin rotation of the rotor prior to takeoff (i.e., prerotation). Prerotation may minimize the takeoff distance down a runway. One type of autogyro is the "gyrodyne." Examples of such aircraft are the XV-1 convertiplane tested in 1954 and the Rotodyne built by Fairey Aviation in 1962. The gyrodyne includes a thrust source providing thrust in a flight direction and a rotor providing autorotative lift at cruising speeds. Jet engines located on the tip of each rotor blade provided rotation of the rotor during takeoff, landing, and hovering.

Although typical rotorcraft provide the significant advantage of vertical takeoff and landing (VTOL), they are much more limited in their maximum flight speed than are fixed-wing aircraft. One reason that prior rotorcraft are unable to achieve high flight speed is a phenomenon known as "retreating blade stall."

In a fixed-wing aircraft, all wings move forward in fixed relation with respect to one another and the airframe. However, as a rotorcraft moves in a flight direction, rotation of the rotor causes each blade thereof to be either "advancing" or "retreating." A blade is advancing if it is moving in the same direction as the flight direction. A blade is retreating if it is moving opposite the flight direction. Thus, the velocity of any point on any blade is the velocity of that point, with respect to the airframe, plus the velocity of the airframe.

Rotor blades are airfoils that provide lift based on the speed of air flow thereover. Accordingly, the advancing blade typically experiences much greater lift than the retreating blade. If left uncheck, this disproportionate lift may render the rotorcraft unflyable. One solution to this problem is allowing the rotor blades to "flap." Flapping enables rotorcraft to travel in a direction substantially perpendicular to the axis of rotation of the rotor.

With flapping, an advancing blade is allowed to fly or flap upward in response to the increased air speed thereover, thereby reducing the blade's angle of attack. This, in turn, reduces the lift generated by the advancing blade. A retreating blade experiences less air speed and tends to fly or flap downward such that its angle of attack is increased. This, in turn, increases the lift generated by the retreating blade. In this manner, flapping balances the lift generated by the advancing and retreating blades.

However, lift equalization due to flapping is limited by retreating blade stall. As noted above, flapping of the rotor blades increases the angle of attack of the retreating blade. At certain higher speeds in the direction of flight, the increase in the blade angle of attack required to equalize lift results in loss of lift (stalling) of the retreating blade.

A second limit on the speed of rotorcraft is the drag at the tips of the rotor blades. The tip of the advancing blade is moving at a speed equal to the speed of the aircraft relative to the surrounding air, plus the speed of the tip of the blade with respect to the aircraft. Thus, the speed at the tip of an advancing blade is equal to the sum of the flight speed of the rotorcraft plus the product of the length of the blade and the angular velocity of the rotor.

In helicopters, the rotor must rotate to provide both upward lift and thrust in the direction of flight. Increasing the speed of a helicopter increases the air speed at the tip, both because of the increased flight speed as well as the increased angular velocity of the rotors required to provide supporting thrust. The speed at the tip of the advancing blade could therefore approach the speed of sound, even when the flight speed of the rotorcraft was actually much less. As the air speed over the tip approaches the speed of sound, the drag on the blade becomes greater than the engine can overcome. Accordingly, helicopters are quite limited in how fast they can fly.

In autogyro aircraft, the tips of the advancing blades are also subject to this increased drag, even for flight speeds much lower than the speed of sound. The tip speed for an autogyro is typically smaller than that of a helicopter, for a given airspeed, since the rotor is not driven. Nevertheless, the same drag increase occurs eventually.

A third limit on the speed of rotorcraft is reverse air flow over the retreating blade. As noted above, the retreating blade is traveling opposite the flight direction with respect to the airframe. At certain high speeds in the direction of flight, portions of the retreating blade may move rearward, with respect to the airframe, slower than the flight speed of the airframe. Accordingly, the direction of air flow over those portions of the retreating blade is reversed from that typically designed to generate positive lift.

Rather then generating positive lift, reverse air flow may impose negative lift, or a downward force, on the retreating blade. That is, an airfoil with positive angle of attack in a first direction has a negative angle of attack in a second direction, opposite the first direction.

The ratio of air speed of a rotorcraft in the direction of flight to the maximum corresponding air speed at the tips of the rotor blades is known as the "advance ratio." The maximum advance ratio of currently available rotorcraft is less than 0.5. For most helicopters, the maximum achievable advance ratio is between about 0.3 and 0.4. Accordingly, current rotorcraft are limited to a top flight speed of about 200 miles per hour (mph) or less.

In view of the foregoing, there are certain advantages that typically pertain to helicopters and others that pertain to autogyro rotorcraft. In certain applications or situations, it may be desirable to incorporate within an autogyro rotorcraft certain advantages typically associated with helicopters. For example, it would be an advancement in the art to provide an autogyro rotorcraft capable of substantially vertical landing or landing with little or no forward roll.

Additionally, certain advantages typically pertain to fixed-wing aircraft, and others pertain to autogyro rotorcraft. In certain applications or situations, it may be desirable to incorporate within an autogyro rotorcraft advantages typically associated with fixed-wing aircraft. For example, it would be an advancement in the art to provide an autogyro rotorcraft capable of high speed flight.

BRIEF SUMMARY OF THE INVENTION

The invention has been developed in response to the present state of the art and, in particular, in response to the problems and needs in the art that have not yet been fully solved by currently available apparatus and methods. The features and advantages of the invention will become more fully apparent from the following description and appended claims, or may be learned by practice of the invention as set forth hereinafter.

In flight, the rotor of an autogyro rotorcraft is typically in autorotation. In autorotation, the rotational speed of the rotor may vary with blade loading, blade pitch angle (i.e., blade angle of attack), angle of attack of rotor disk, air density, and the like. However, prior to take-off, the rotor of an autogyro rotorcraft may be temporarily powered (e.g., rotated under power from an engine of the autogyro rotorcraft) to increase its rotational speed to a particular value. The particular value may be from about sixty percent to about one hundred fifty percent of the rotor's rotational speed in normal operation (e.g., rotational speed at cruise). This prerotation may enable a shorter take-off, an ultra-short take-off, or even a jump take-off.

The system charged with temporarily powering a rotor on the ground may be referred to as a prerotation system. In general, a prerotation system may conduct power from a source (e.g., an engine of the rotorcraft) to a rotor. Prerotation systems in accordance with the present invention may vary widely in how they conduct that power.

For rotors with collective pitch control, the power supplied by a prerotation system may be about, or little more than, the amount required to turn the rotor at flat pitch. In such embodiments, the power required by the prerotation system may be thirty percent or less of the power required for sustained hover. Moreover, set with the blade pitch flat, the rotor may be spun up to about one hundred fifty percent of the rotor's rotational speed in normal operation or about the maximum permitted rotational speed for safe operation of the rotor.

For rotors without collective pitch control, the upper limit for the rotational speed of the rotor during prerotation may be lower. For example, the rotor cannot safely be spun up to a rotational speed generating sufficient lift to endanger the rotorcraft should it be hit with a gust of wind. Accordingly, rotors without collective pitch control may be prerotated to less than the rotational speed necessary for sustained flight. Once the appropriate rotational speed has been reached, the prerotation system may be disengaged and the rotorcraft may begin its take-off run. As the rotorcraft rolls down the runway, the passing air may increase the rotational speed of the rotor until sufficient lift can be generated for the rotorcraft to take flight.

An autogyro rotorcraft may maintain level flight at low speeds, well below the stall speed of typical fixed wing aircraft. As airspeed of an autogyro rotorcraft is reduced, the rotorcraft may maintain the rotational speed of the rotor and continue to fly on the "backside" of the power curve, where additional reductions in airspeed require greater power or thrust propelling the rotorcraft forward. At some very low airspeed, the induced drag corresponding to the rotor may equal the available thrust from the rotorcraft. Thereafter, further reductions in airspeed may not produce a stall, but rather a descent of the autogyro rotorcraft.

Such a descent is typically intended and brings the autogyro rotorcraft to a landing. An autogyro rotorcraft will typically land in the same manner as a fixed wing aircraft. However, the landing roll associated with an autogyro rotorcraft may be much shorter that associated with an autogyro rotorcraft. Employing apparatus and methods in accordance with the present invention may substantially eliminate landing roll.

During a landing approach, the rotor of an autogyro rotorcraft may be tilted aft (i.e., flared), increasing the angle of attack of the rotor disk. Additionally, collective may be "pulled" (i.e., the blade pitch or blade angle of attack may be increased for each blade of the rotor). By flaring the rotor, a greater portion of the lift produced thereby may oppose forward motion of the autogyro rotorcraft. Pulling collective may increase the lift (and the corresponding induced drag) produced by the rotor. Accordingly, both actions, alone or in combination, slow an rotorcraft's forward motion and reduce the amount of landing roll required to bring the autogyro rotorcraft to a halt.

A gyrodyne may use a powered rotor to take off, but revert to autorotation in cruise mode. A gyrodyne may be landed in the same manner as a helicopter when the rotor is powered. However, a gyrodyne may also be landed in autorotation.

Accordingly, the landing approach for a gyrodyne may include flaring the rotor, pulling collective, or both.

With greater kinetic energy, a rotor may produce increased lift. Increased lift, in turn, may produce a greater ability to stop forward motion of the autogyro rotorcraft. Therefore, by enabling a pilot to selectively increase the kinetic energy of a rotor, apparatus and methods in accordance with the present invention may provide to the pilot a greater ability to stop forward motion of an autogyro rotorcraft before touching down, or otherwise improve landing performance.

The kinetic energy of a rotor may be increased in any suitable manner. In selected embodiments, a prerotation system may be used in flight to spin up a rotor before flaring, pulling collective, or both. In such embodiments, the prerotation system may be engaged (e.g., start urging faster rotation of the rotor) while the rotorcraft has sufficient airspeed to ensure adequate yaw control.

In other embodiments, the rotational speed and kinetic energy of a rotor may be increased without direct powering of the rotor. In certain such embodiments, various aerodynamic forces may be used to increase the rotational speed of a rotor prior to commencement of the landing maneuver. For example, the rotational speed of a rotor is dependent, at least partially, on blade pitch. By decreasing collective pitch, a pilot may increase the windmill effect, resulting in increased rotational speed of the rotor.

Once the rotational speed of a rotor has been increased to a desired level, the pilot may prepare for landing. This preparation may include a descent. Accordingly, given the higher rotational speed of the rotor, a pilot may manipulate collective pitch to control rotor lift and ensure a descending flight path. A landing routine for the rotorcraft may still include flaring the rotor, pulling collective, or both. However, both actions may be applied in a controlled manner, with the pilot checking the rotational speed of the rotor to ensure that the rotor does not exceed the maximum permitted.

With the greater amount of kinetic energy stored in the rotation of the rotor, a pilot may have a greater ability to stop the forward progress of the rotorcraft before touchdown. Accordingly, the rotorcraft may land with little to no forward roll (e.g., forward roll of one meter or less). Thus, the rotorcraft may execute a substantially vertical landing every time. This added capability provided by apparatus and methods in accordance with the present invention may support safe landings on smooth or rough terrain and at higher altitudes than previously available.

In selected embodiments, a rotorcraft in accordance with the present invention may be configured to support high speed flight (e.g., airspeeds of about 250 miles per hour and above). At such high advance ratios, autorotation is theoretically possible. However, the operating angle of attack of the rotor disk would have to be maintained within a very small margin. Such a small operational window leads to instability. This small margin may make control of rotor RPM extremely difficult in anything but perfectly smooth air.

To overcome the problems of high speed autorotation, rotorcraft in accordance with the present invention may transition to powered rotation during high speed flight. In selected embodiments, a prerotation system may be used to power the rotation of the rotor at such speeds. Once engaged, the prerotation system may maintain rotor RPM at a desired level. Additionally, under power, it may be possible to transition a rotor rapidly through resonance conditions.

When powered, a rotor may be completely unloaded (e.g., provide no lift to support the weight of the rotorcraft). Accordingly, one or more wings, together with any other fixed lifting surfaces of the rotorcraft, may support the entire weight of the rotorcraft.

In certain embodiments, high speed flight in a rotorcraft may comprise a complete conversion from the low speed helicopter-type controls (e.g., cyclic and collective pitch) to conventional fixed wing controls (e.g., ailerons, rudder, and elevator). Accordingly, cyclic and collective controls may be left in a fixed position during high speed, level flight. However, during high speed maneuvers, cyclic controls may be used to maintain a rotor in an unloaded conditional. This may leave the wings and any other fixed lifting surfaces to support all loads (e.g., positive and negative g-loads).

BRIEF DESCRIPTION OF THE DRAWINGS

The foregoing features of the present invention will become more fully apparent from the following description and appended claims, taken in conjunction with the accompanying drawings. Understanding that these drawings depict only typical embodiments of the invention and are, therefore, not to be considered limiting of its scope, the invention will be described with additional specificity and detail through use of the accompanying drawings in which:

DETAILED DESCRIPTION OF SELECTED EMBODIMENTS

Figure 1:
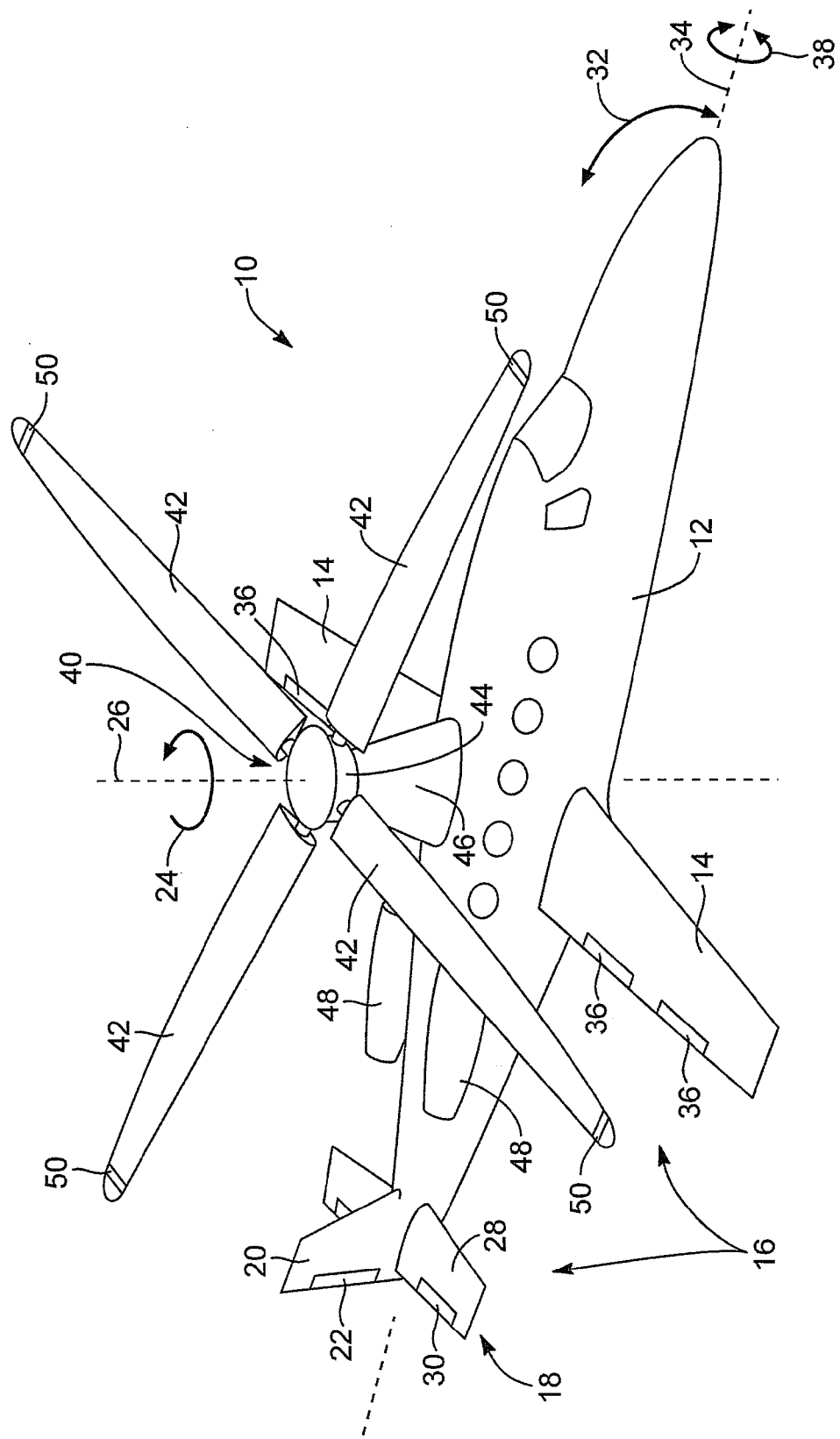
FIG. 1 is a perspective view of a rotorcraft in accordance with one embodiment of the present invention, the rotorcraft having two engines and one rotor.

It will be readily understood that the components of the present invention, as generally described and illustrated in the drawings herein, could be arranged and designed in a wide variety of different configurations. Thus, the following more detailed description of the embodiments of the system and method of the present invention, as represented in the drawings, is not intended to limit the scope of the invention, as claimed, but is merely representative of various embodiments of the invention. The illustrated embodiments of the invention will be best understood by reference to the drawings, wherein like parts are designated by like numerals throughout.

Referring to FIG. 1, a rotorcraft 10 in accordance with the present invention may include an airframe 12 defining a cabin for carrying an operator, passengers, cargo, or the like. The airframe 12 may include one or more fixed wings 14 or airfoils 14 providing lift to the rotorcraft 10. The wings 14 may be configured such that they provide sufficient lift to overcome the weight of the rotorcraft 10 (or any significant portion thereof) only at comparatively high speeds.

That is, a rotorcraft 10 may be capable of vertical takeoff and landing (VTOL) and may not need lift from the fixed wings 14 at low speeds (e.g., below 50 mph or even 100 mph). Accordingly, the wings 14 may be made smaller than those of fixed-wing aircraft requiring a high velocity takeoff. The smaller wings 14 may result in lower drag at higher velocities. In some embodiments, the wings 14 may provide sufficient lift to support at least 50 percent, preferably about 90 percent, of the weight of the rotorcraft 10 at air speeds above 200 mph.

Control surfaces 16 may form part of an airframe 12. For example a tail structure 18 may include one or more vertical stabilizers 20 and one or more rudders 22. The rudders 22 may be adjustable to control yaw 24 of the rotorcraft 10 during flight. As known in the art, yaw 24 is defined as rotation about a vertical axis 26 of the rotorcraft 10. In the illustrated embodiment, the rudders 22 may comprise hinged portions of the vertical stabilizers 20.

The tail structure 18 may further include a horizontal stabilizer 28 and an elevator 30. The elevator 30 may be adjustable to alter pitch 32 of the rotorcraft 10. As known in the art, pitch 32 is defined as rotation about an axis extending laterally with respect to the airframe 10. In the illustrated embodiment, the elevator 30 is a hinged portion of the horizontal stabilizer 28. In some embodiments, twin rudders 22 may be positioned at an angle relative to the vertical axis 26 and serve both to adjust or control yaw 24 and pitch 32 of the rotorcraft 10.

The control surfaces 16 may also include ailerons 36 on the wings 14. Ailerons 36 may be used to control roll 38 of the rotorcraft 10. As known in the art, roll 38 is defined as rotation about the longitudinal axis 34 of the rotorcraft 10.

Lift during vertical takeoff and landing, and for augmenting lift of the wings 14 during flight, may be provided by a rotor 40. A rotor 40 may comprise a number of individual rotor blades 42 extending radially away from a hub 44. The hub 44 may be coupled to a mast 46. The mast 46 may extend to connect the hub 44 to the rest of the airframe 12.

Figure 2:
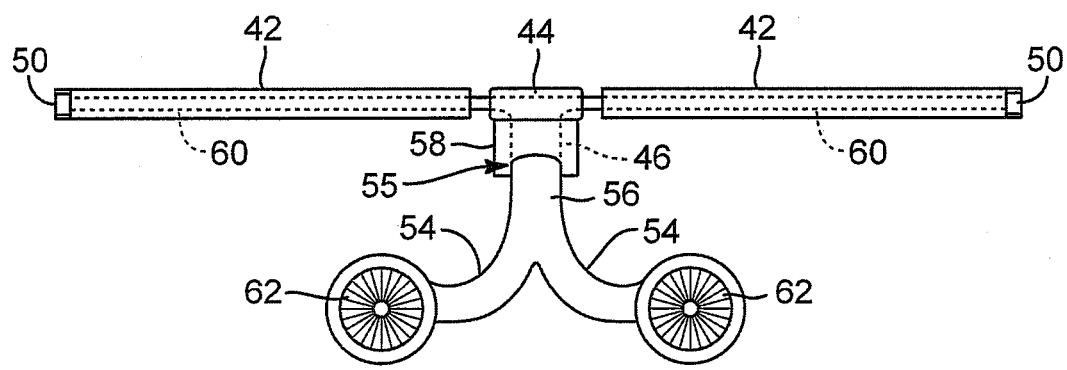
FIG. 2 is a schematic front elevation view of a compressed or otherwise pressurized air supply for tip jets in accordance with one embodiment of the present invention.

Referring to FIG. 2, a rotor 40 may be coupled to one or more engines 48 housed in a fuselage portion of the airframe 12 or in one or more adjacent nacelles. The engines 48 may provide thrust during flight of the rotorcraft 10. The engines 48 may also generate compressed air for the tip jets 50.

For example, in selected embodiments, the engines 48 may comprise one or more bypass turbines 62. All or a portion of the bypass air from the turbines 62 may be directed to the tip jets 50. Alternatively, the engines 48 may drive one or more auxiliary compressors, which in turn may provide the compressed air for the tip jets 50. In still other embodiments, all or a portion of the compressed air may be generated by one or more dedicated, single purpose engines, motors, or the like. Using the compressed air, the tip jets 50 may power the rotor 40 during takeoff, landing, hover, or whenever the flight speed of the rotorcraft 10 is too low for sufficient lift from autorotation of the rotor 40.

In selected embodiments, the compressed air generated by the engines 48 may be conducted to the tip jets 50 via one or more conduits or ducts 54, 55. For example, bypass air from one or more bypass turbines 62 may be transmitted through ducts 54 to a plenum 56. The plenum 56 may be in fluid communication via ducting 55 with a mast 46 that is hollow or has another passage to provide for air conduction. For example, a mast fairing 58 positioned around the mast 46 may provide one or both of an air channel and a low drag profile for the mast 46. The mast 46 or mast fairing 58 may be in fluid communication with a hub 44. Finally, the hub 44 may be in fluid communication with an interior conduit 60 within each of the various rotor blades 42. Accordingly, the compressed air may travel radially within the interior conduits 60 to feed the corresponding tip jets 50.

Figure 3A:
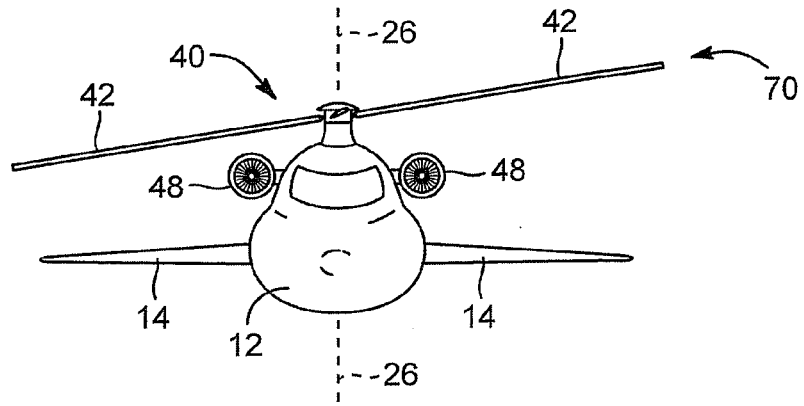
FIG. 3A is a front elevation view of a rotorcraft illustrating operational parameters describing a rotor configuration suitable for use in accordance with the present invention and the system of FIGS. 1 and 2 in particular.
Figure 3B:
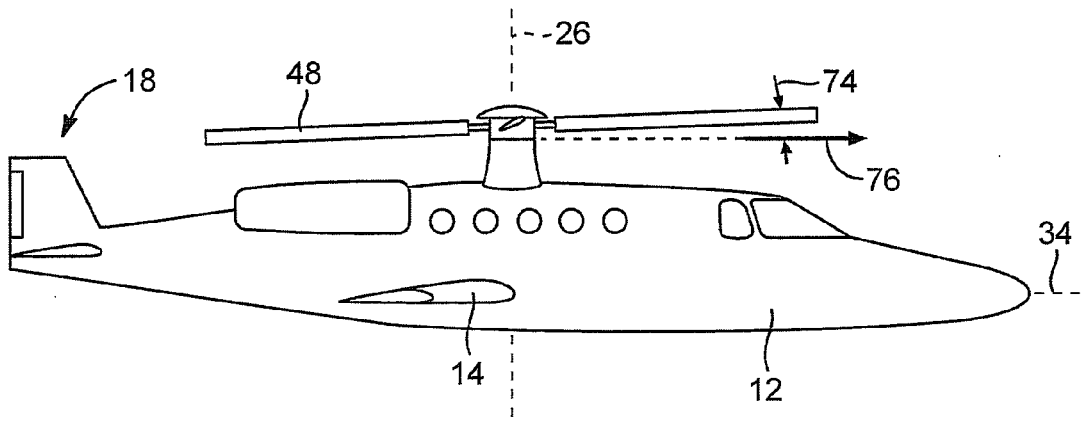
FIG. 3B is a right side elevation view of the rotorcraft of FIG. 3A.
Figure 3C:
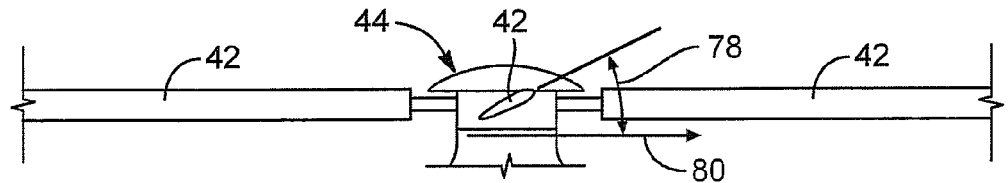
FIG. 3C is a partial cut of a right side elevation view of the rotor of FIG. 3A.

Referring to FIGS. 3A-3C, rotation of the rotor 40 about its axis of rotation occurs in a rotor disc 70 that is generally planar but may be contoured due to flexing of the blades 42. In general, the rotor disc 70 may be defined as a space in which the tips of the blades 42 travel. Inasmuch as the blades 42 flap cyclically upward and downward due to changes in lift while advancing and retreating, the rotor disc 70 may be angled or contoured with respect to the axis of rotation when viewed along the longitudinal axis 34, as shown in FIG. 3A.

Referring to FIG. 3B, the angle 74 of the rotor disc 70, relative to a flight direction 76 in the plane containing the longitudinal axis 34 and vertical axis 26, is defined as the rotor angle of attack 74 or rotor disk angle of attack 74. For purposes of this application, flight direction 76 and air speed refer to the direction and speed, respectively, of the airframe 12 of the rotorcraft 10 relative to surrounding air. In autogyro systems, the angle of attack 74 of the rotor disc 70 is generally positive in order to achieve autorotation of the rotor 40 and the resulting lift.

Referring to FIG. 3C, the surfaces of the rotor blades 42, and particularly the chord of each blade 42, define a pitch angle 78, or blade angle of attack 78, relative to the direction of movement 80 of the rotor blades 42. In general, a higher pitch angle 78 will result in more lift and higher drag on the rotor blade 42, up to the point where stalling occurs (at which point lift has declined below a value necessary to sustain flight). The pitch angle 78 of the rotor blade 42 may be manipulated by both cyclic and collective pitch controls.

Figure 4:
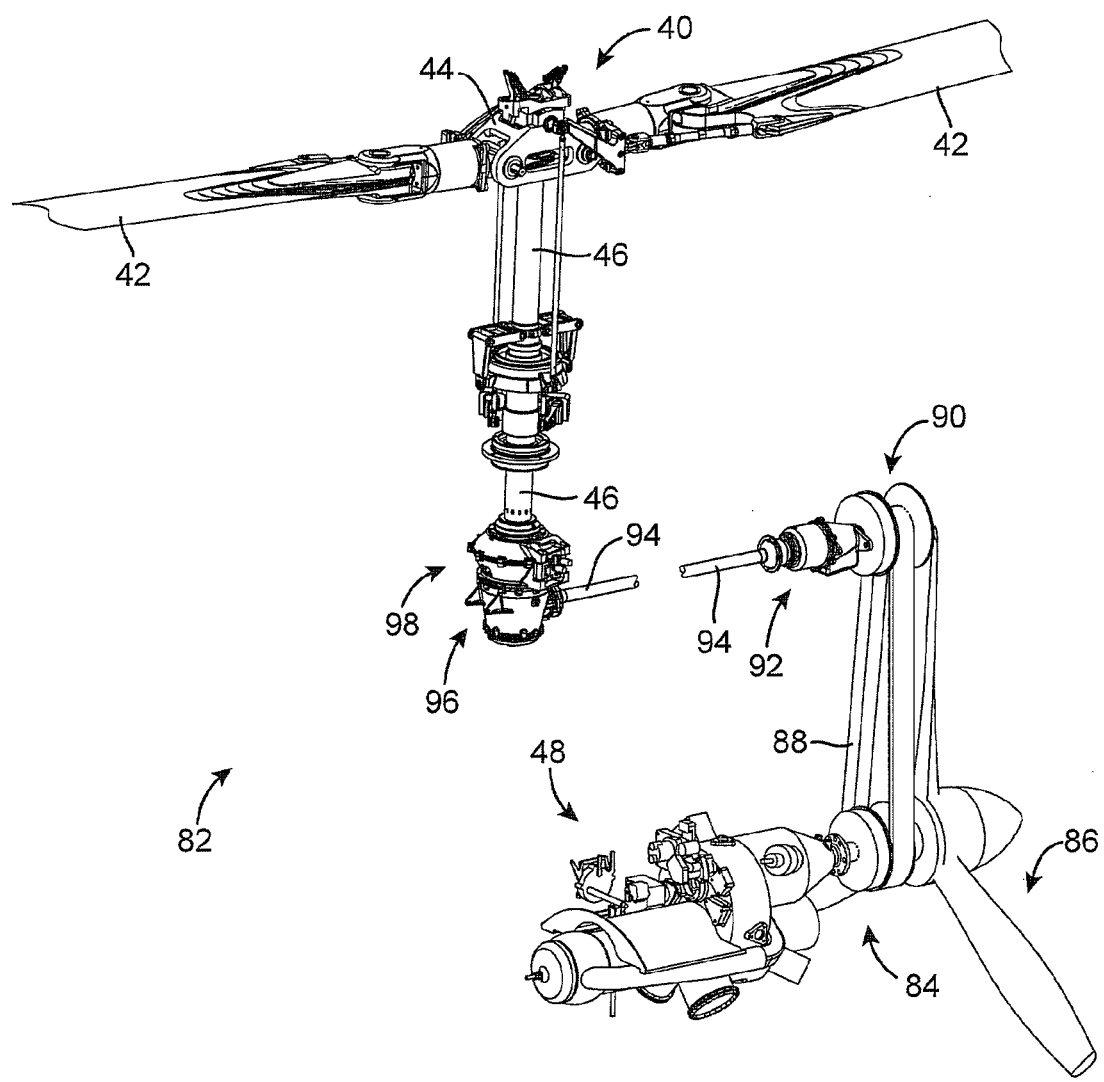
FIG. 4 is a perspective view of an engine, prerotation system, and rotor in accordance with the present invention.

Referring to FIG. 4, in certain embodiments, tip jets 50 and corresponding ducting 54, 55, 56, 60 may be omitted and a prerotation system 82 may be added. One purpose of a prerotation system 82 may be to temporarily power a rotor 40 on the ground before a rotorcraft 10 takes flight. In general, a prerotation system 82 may conduct power from a source (e.g., an engine 48 of the rotorcraft 10) to a rotor 40. Prerotation systems 82 in accordance with the present invention may vary widely in how they conduct that power. For example, a prerotation system 82 may conduct power hydraulically, electrically, or the like. A prerotation system 82 may also mechanically conduct power via a drive shaft (e.g., a rigid drive shaft, a flexible drive shaft, etc.).

For example, in selected embodiments, a prerotation system 82 may include a drive pulley 84 urged in rotation by at least one engine 48. The drive pulley 84 may be connected to the engine 48 in any suitable manner. In certain embodiments, a drive pulley 84 may ride on a prop-shaft extending to a propeller 86 or on some other power take-off (PTO) of the engine 48. A belt 88 may extend from a drive pulley 84 to engage a driven pulley 90.

A driven pulley 90 may be connected by a clutch 92 to a drive shaft 94. The clutch 92 may rotationally connect and disconnect the driven pulley 90 and the drive shaft 94 in accordance with control commands issued by a pilot or automated flight control system. For example, to engage a prerotation system 82, a command to engage the clutch 92 may be issued. Conversely, to disengage a prerotation system 82, a command to disengage the clutch 92 may be issued. When the clutch 92 disengages a driven pulley 90 from a drive shaft 94, the parasitic loads imposed on an engine 48 by a prerotation system 82 may be minimal.

A clutch 92 may also buffer changes in the transmission of rotation between the driven pulley 90 and the drive shaft 94. For example, a clutch 92 may permit slippage as the driven pulley 90 brings the drive shaft 94 up to speed. Once the driven pulley 90 and drive shaft 94 are rotating at the same speed, the clutch 92, when engaged, may effectively lock the driven pulley 92 and drive shaft 94 together and require them to rotate at the same speed.

A drive shaft 94 in accordance with the present invention may be rigid or flexible. A drive shaft 94 may extend from a clutch 92 to engage a reduction gear assembly 96. A reduction gear assembly 96 may convert the relatively high rotational outputs from a drive shaft 94 into relatively low rotational inputs for a mast 46 or rotor 40. In selected embodiments, a pawl clutch 98 may form an interface between a reduction gear assembly 96 and a mast 46 or rotor 40. Alternatively, a drive shaft 94 may extend from a clutch 92 to engage a pawl clutch 98. In such embodiments, a reduction gear assembly 96 may form an interface between the pawl clutch 98 and a mast 46 or rotor 40.

A pawl clutch 98 may support unidirectional rotation of a mast 46 or rotor 40 as well as overrun of the mast 46 or rotor 40 with respect to the engine 48. For example, in selected embodiments, a pawl clutch 98 may enable a mast 46 or rotor 40 to freely turn faster than the rotational output of the prerotation system 82 at the reduction gearbox 96. In certain embodiments, a pawl clutch 98 may be selectively disengaged in accordance with command inputs to permit a mast 46 or rotor 40 to freely turn more slowly than the rotational output of a prerotation system 82. A pawl clutch 98 may also include a mode or configuration wherein the input and output are locked together in unitary rotation.

A prerotation system 82 in accordance with the present invention may allow the rotational speed of a rotor 40 to be brought to a maximum (e.g., the maximum permitted rotational speed for safe operation of the rotor 40) without directly tracking the rotational speed of a corresponding engine 48. In selected embodiments, a prerotation system 82 may include a drive belt 88 riding between two variable diameter V-pulleys 84, 90 to form a continuously variable transmission.

In such embodiments, changes in the effective diameters of the two V-pulleys 84, 90 may provide control over the rotational speed on the output side of the prerotation system 82. The effective diameters of variable V-pulleys 84, 90 may be controlled in any suitable manner. Suitable controls may operate using forces (e.g., centrifugal forces) linked to rotational speed. Suitable controls may also operate using forces generated by external sources (e.g., forces generated by external pneumatic, hydraulic, electronic, or mechanical actuation).

Figure 5:
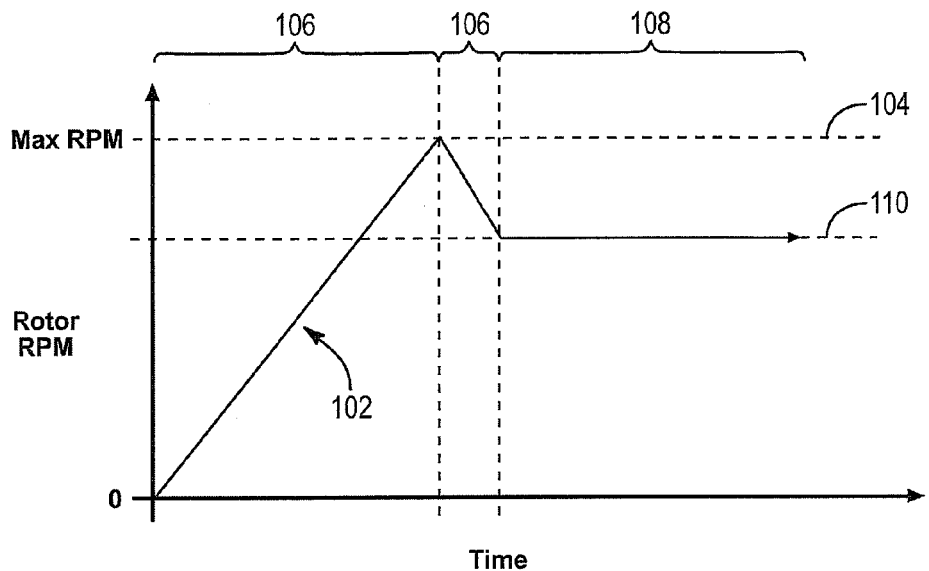
FIG. 5 is a schematic plot comparing rotor RPM versus time from prerotation, through take-off, and into steady flight for a rotorcraft having collective pitch control.

Referring to FIG. 5, in flight, the rotor 40 of a rotorcraft 10 in accordance with the present invention may be in autorotation. In autorotation, the rotational speed of the rotor 40 may vary with blade loading, blade pitch angle 78 (i.e., blade angle of attack 78), angle of attack 74 of the rotor disk, air density, and the like. However, prior to take-off, a rotor 40 of a rotorcraft 10 may be temporarily powered by a prerotation system 82 to increase the rotational speed of the rotor 40 to a particular value. The particular value may be from about sixty percent to about one hundred fifty percent of the rotational speed of the rotor 40 in normal operation (e.g., rotational speed at autorotative cruise). This prerotation 100 may enable a shorter take-off, an ultra-short take-off, or even a jump take-off.

To illustrate the matter further, the plots 102 of FIGS. 5-7, 9, and 11 schematically map rotor RPM versus time for various pre-flight, flight, and post-flight portions or segments. These plots 102 are intended only as illustrative of certain potential trends and proportions. However, due to the many factors and inputs affecting rotorcraft performance and behavior, many variations from the plots 102 provided may be performed or accommodated within the scope of the present invention. For example, certain behavior may be illustrated and described as decreasing rotor RPM when, in particular situations or maneuvers or with particular pilot inputs, it may actually increase rotor RPM. Accordingly, the plots 102 are not intended to limit the scope of the invention.

Referring again to FIG. 5, during prerotation 100, the rotorcraft 10 may rest on the ground and a prerotation system 82 may be engaged and power rotation of the rotor 40. Accordingly, during prerotation 100, rotor RPM may increase from zero to some desired prerotation RPM. The particular desired prerotation RPM may depend on various factors including whether the rotor 40 has collective pitch control, the maximum permitted RPM 104 for safe operation of the rotor 40, and the like.

For rotors 40 with collective pitch control, the power supplied by a prerotation system 82 may be about, or little more than, the amount required to turn the rotor 40 at flat or even negative pitch. In such embodiments, the power required by the prerotation system 82 may be thirty percent or less of the power required for sustained hover. Moreover, set with the blade pitch flat, the rotor 40 may be spun up during prerotation 100 to the maximum RPM 104 permitted for safe operation of the rotor 40. In selected embodiments, the maximum permitted RPM 104 may be typically about one hundred fifty percent of the rotor's RPM in normal, steady, autorotative flight.

Once the maximum permitted RPM 104 is reached, a rotor 40 having collective pitch control is prepared to execute a shorter take-off, an ultra-short take-off, or even a jump take-off. During any such take-off, some portion of the kinetic energy stored in the rotor 40 during prerotation 100 may be converted to potential energy (i.e., gain in altitude). Accordingly, during altitude gain 106, the rotorcraft 10 may take flight and the rotor RPM may decrease. Upon reaching a desired cruising altitude, the rotorcraft 10 may level out in efficient, steady, straight, autorotative flight. Thus, during cruise 108, the rotor RPM may hold steady at a cruise RPM 110.

Figure 6:
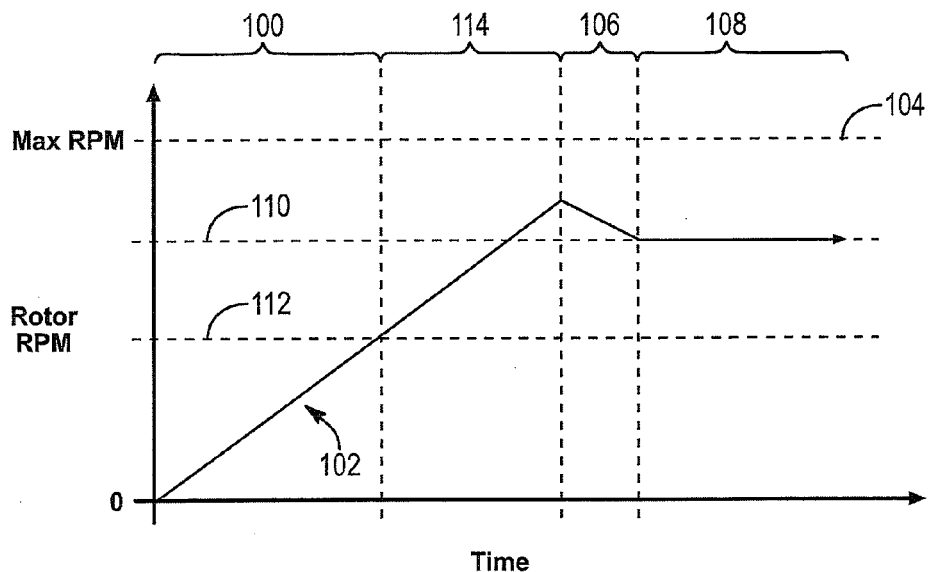
FIG. 6 is a schematic plot comparing rotor RPM versus time from prerotation, through take-off, and into steady flight for a rotorcraft having no collective pitch control.

Referring to FIG. 6, for rotors 40 without collective pitch control, the upper limit for the max RPM of the rotor 40 during prerotation 100 may be comparatively low. For example, the rotor 40 may not be safely spun up to a rotational speed generating sufficient lift to endanger the rotorcraft 10 should it be hit with a gust of wind. Accordingly, rotors 40 without collective pitch control may be spun up to a prerotation RPM 112 less than a cruise RPM 110 necessary for efficient, steady, straight, autorotative flight.

In such embodiments, once the appropriate prerotation RPM 112 has been reached, the prerotation system 82 may be disengaged and the rotorcraft 82 may begin its take-off roll 114. As the rotorcraft 10 rolls 114 down the runway, the passing air through the rotor 40 may increase the rotational speed of the rotor 40. Accordingly, during take-off roll 114, the RPM of a rotor 40 may increase. The RPM of the rotor 40 may increase until sufficient kinetic energy has been stored within the rotor 40 to support lift-off.

To effect lift-off, the angle of attack 74 of the rotor disk may being increased to increase the lift produced by the rotor 40. To produce this additional lift, some portion of the kinetic energy stored in the rotor 40 may be converted to potential energy (i.e., gain in altitude). Accordingly, during altitude gain 106, the rotorcraft 10 may take flight and the rotor RPM may decrease. Upon reaching a desired cruising altitude, the rotorcraft 10 may level out in efficient, steady, straight, autorotative flight. Thus, during cruise 108, the rotor RPM may hold steady at a cruise RPM 110.

Figure 7:
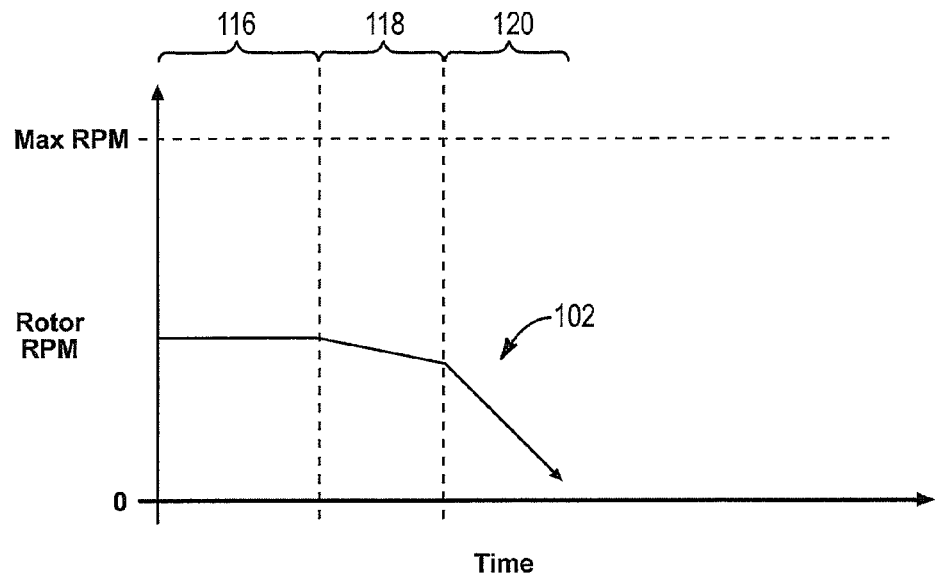
FIG. 7 is a schematic plot comparing rotor RPM versus time from steady flight, through in-flight braking, and on to landing without increasing or maximizing rotor RPM.

Referring to FIG. 7, an autogyro rotorcraft 10 may land in the same manner as a fixed wing aircraft. However, the landing roll associated with an autogyro rotorcraft 10 may be much shorter that associated with a fixed wing aircraft. Apparatus and methods in accordance with the present invention may substantially eliminate landing roll.

During a landing approach 116, a rotorcraft 10 may be in autorotation and rotor RPM may be held substantially constant. However, as a rotorcraft 10 nears the landing site, the rotor 40 may be tilted aft (i.e., flared) to increase the angle of attack 74 of the rotor disk. Additionally, collective may be "pulled" (i.e., the pitch 78 or angle of attack 78 may be increased for each blade 42 of the rotor 40). Flaring and pulling collective, alone or in combination, may constitute in-flight, autorotative braking 118, which reduces the forward airspeed of the rotorcraft 10.

During in-flight, autorotative braking 118, rotor RPM may decrease. Initially, flaring, by itself, may tend to increase blade loading and, therefore, rotor RPM. However, pulling collective (or the pitch built into a rotor without collective pitch control) may tend to decrease rotor RPM. Accordingly, over the course of the braking 118, the rotor 40 may typically experience a net decrease in rotational speed. Once a rotorcraft 10 has landed and ended its forward roll, the forces urging autorotation of the rotor 40 may be removed. Accordingly, during this period 120, aerodynamic drag may bring the rotor RPM down to zero.

Figure 8:
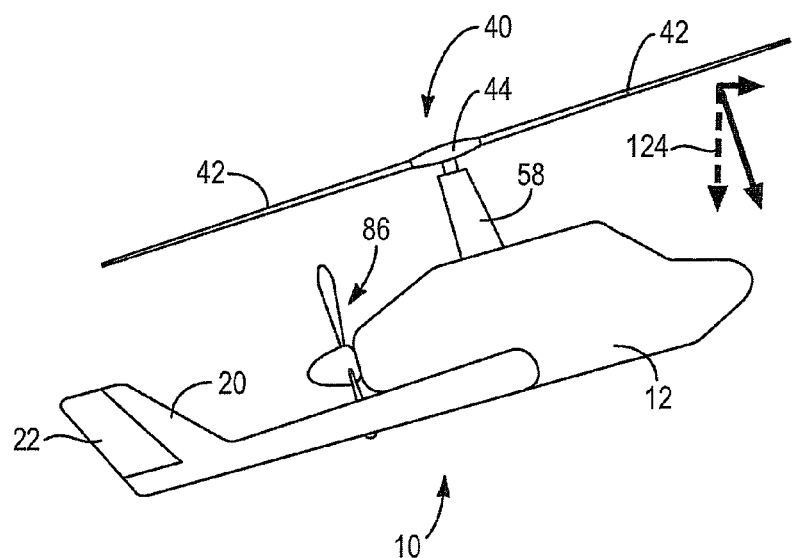
FIG. 8 is a schematic side elevation view of one embodiment of a rotorcraft flaring in accordance with the present invention.

Referring to FIG. 8, the lift 122 produced by a rotor 40 may be resolved into a vertical component 124 and a horizontal component 126. The horizontal component 126 may contribute to or comprise induced drag and oppose forward motion of the rotorcraft 10. By flaring a rotor 40, a pilot may increase, for a given lift 122, the horizontal component 126. Accordingly, flaring may increase the ability of the horizontal component 126 to oppose (and consequently slow) forward motion of the rotorcraft 10.

Pulling collective may increase the lift 122 produced by a rotor 40. An increased lift 22 translates automatically to an increased horizontal component 126. Pulling collective may, therefore, also increase the ability of the horizontal component 126 to oppose forward motion of the rotorcraft 10. Accordingly, both flaring a rotor 40 and increasing the collective pitch of a rotor 40, alone or in combination, may slow the forward motion of a rotorcraft 10 and reduce the amount of landing roll required to being the rotorcraft 10 to a halt.

A rotor 40 may be flared in any suitable manner. In selected embodiments, a rotor 40 may be flared by tilting the hub 44 of the rotor 40 with respect to the mast 46. However, in other embodiments, a hub 44 may not tilt with respect to a corresponding mast 46. In such embodiments, the rotor 40 may be flared by pitching the entire rotorcraft 12 upward.

A gyrodyne may use a powered rotor to take off, but revert to autorotation in cruise. A gyrodyne may be landed in the same manner as helicopters when the rotor is powered. However, a gyrodyne may also be landed in autorotation. Accordingly, the landing approach for a gyrodyne may include flaring the rotor, pulling collective, or both.

Figure 9:
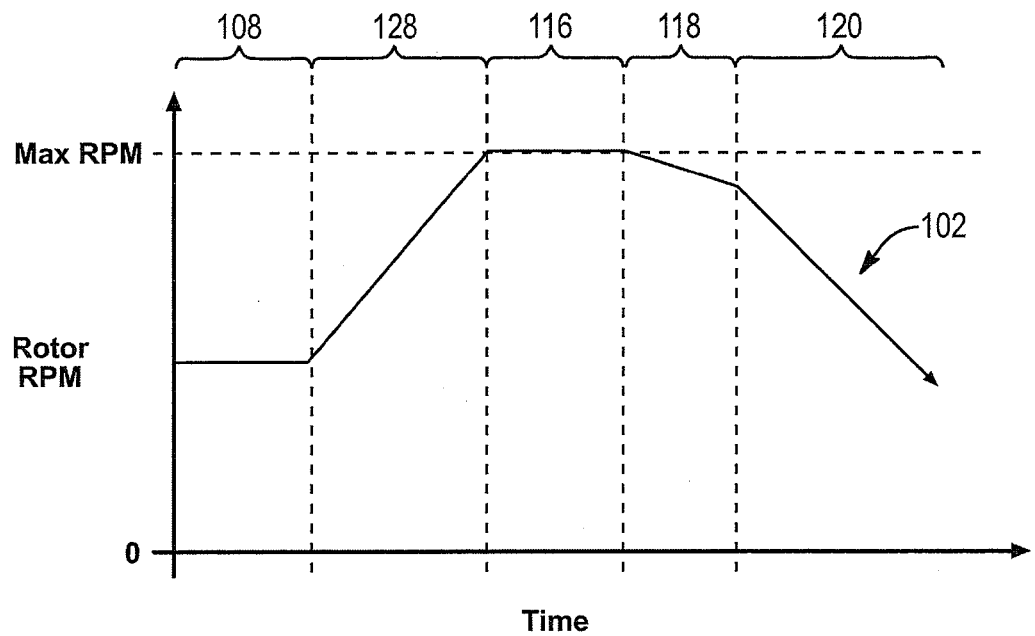
FIG. 9 is a schematic plot comparing rotor RPM versus time from steady flight, through an increase in rotor RPM, through in-flight braking, and on to landing in accordance with the present invention.

Referring to FIG. 9, with greater kinetic energy, a rotor 40 may produce increased lift 122. Increased lift 122, in turn, may be directed to produce a greater ability to stop forward motion of an autogyro rotorcraft 10. Therefore, by increasing 128 the kinetic energy of a rotor 40 (e.g., spinning up 128 a rotor 40), apparatus and methods in accordance with the present invention may provide to a pilot a greater ability to stop forward motion of an autogyro rotorcraft 10 before touching down or otherwise improve landing performance.

The kinetic energy of a rotor 40 may be increased 128 in any suitable manner. In selected embodiments, a prerotation system 82 may be used in flight to spin up 128 a rotor 40 before in-flight, autorotative braking 118 (i.e., before flaring, pulling collective, or both) begins. In such embodiments, the prerotation system 82 may be engaged (e.g., start urging faster rotation of the rotor 40) while the rotorcraft 10 has sufficient airspeed to ensure adequate yaw control.

That is, when powering a rotor 40, a prerotation system 82 may induce a reactionary torque on the airframe 12 of the rotorcraft 10. By engaging the prerotation system 82 in flight only when the rotorcraft 10 has sufficient airspeed, the rotorcraft 10 may be ensured enough airflow over the control surfaces (e.g., vertical stabilizers 20, rudder 22, or the like) to counteract the reactive torque. The prerotation system 82 may be disengaged (e.g., stop powering the rotor 40) before the airspeed of the rotorcraft 10 is too low to provide adequate yaw control over a reactive torque.

Powering a rotor 40 in flight may reduce the power available to generate thrust propelling the rotorcraft 10 forward. However, by increasing the rotational speed of the rotor 40, it may generate sufficient lift 122 at a lower disk angle of attack 74, lower collective blade pitch 78, or both. Accordingly, the rotor 40 may generate sufficient lift 122 with significantly less induced drag (e.g., less horizontal component 126). The reduction in induced drag may be comparable to, or even less than, the reduction in power available to generate thrust. Thus, the ratio of total lift 122 to total drag for the autogyro rotorcraft 10 may be preserved or even improved during the in-flight powering of the rotor 40.

In other embodiments, the rotational speed and kinetic energy of a rotor 40 may be increased 128 without direct powering of the rotor 40. In certain such embodiments, various aerodynamic forces, flying maneuvers, and the like may be used to increase the rotational speed of an unpowered rotor prior to commencement of in-flight, autorotative braking 118. For example, the rotational speed of a rotor 40 is dependent, at least partially, on blade pitch 78. By decreasing collective pitch 78, a pilot may increased the rotational speed of the rotor 40 by windmilling or autorotation. Additionally, by executing a tight turn, a pilot may increase blade loading and, consequently, the rotational speed of the rotor 40. Combined actions may also be used to increase the rotational speed of a rotor 40 (e.g., simultaneously turning and reducing collective pitch).

Once the rotational speed of a rotor 40 has been increased 128 to a desired level (e.g., to a maximum permitted RPM), the pilot may prepare for landing. This preparation may include an approach 116 and, therefore, a descent. Accordingly, given the higher rotational speed of the rotor 40, a pilot may manipulate collective pitch to control rotor lift 122 and ensure a descending flight path. A landing routine for the rotorcraft 10 may still include in-flight, autorotative braking 118 (e.g., flaring the rotor, pulling collective, or both). However, braking 118 may be applied in a controlled manner, with the pilot checking the rotational speed of the rotor 40 to ensure that the rotor 40 does not exceed the maximum permitted RPM.

Figure 10:
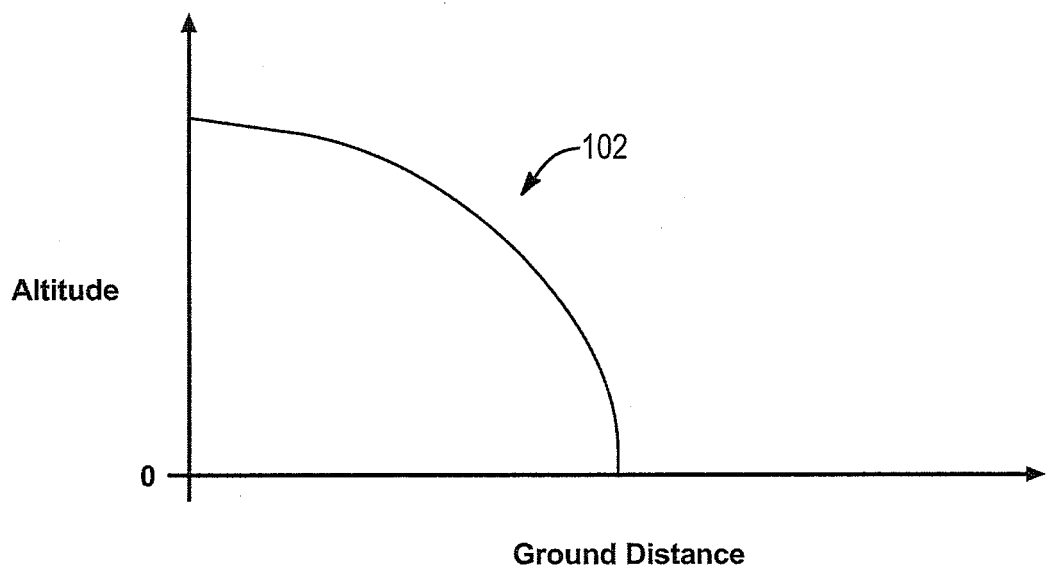
FIG. 10 is a schematic plot comparing altitude versus ground distance traveled for a rotorcraft landing after increasing or maximizing rotor RPM in accordance with the present invention.

Referring to FIG. 10, a plot 130 may schematically map altitude versus ground distance for an approach and autorotative landing in accordance with the present invention. This plot 130 is intended only as illustrative. Many factors and inputs affecting rotorcraft performance and behavior may result in variations from the plot 130 that are within the scope of the present invention. Accordingly, the plot 130 is not intended to limit the scope of the invention.

With a greater amount of kinetic energy stored in the rotor 40, a pilot may have a greater energy and momentum reservoir to tap when seeking to stop the forward progress of the rotorcraft 10 before touch down. Accordingly, more (e.g., substantially all) forward progress may be stopped in flight, leaving less or none to be stopped on the ground. Thus, a rotorcraft 10 employing apparatus and methods in accordance with the present invention may land with little to no forward roll (e.g., forward roll of one meter or less).

Additionally, with a greater amount of kinetic energy stored in the rotor 40, a pilot may have a greater reservoir to tap when seeking to control descent once the forward progress of a rotorcraft 10 has been reduced or eliminated. Thus, a rotorcraft 10 employing apparatus and methods in accordance with the present invention may execute a substantially vertical landing every time. This added capability may support safe landings on smooth or rough terrain and at higher altitudes than previously available.

Figure 11:
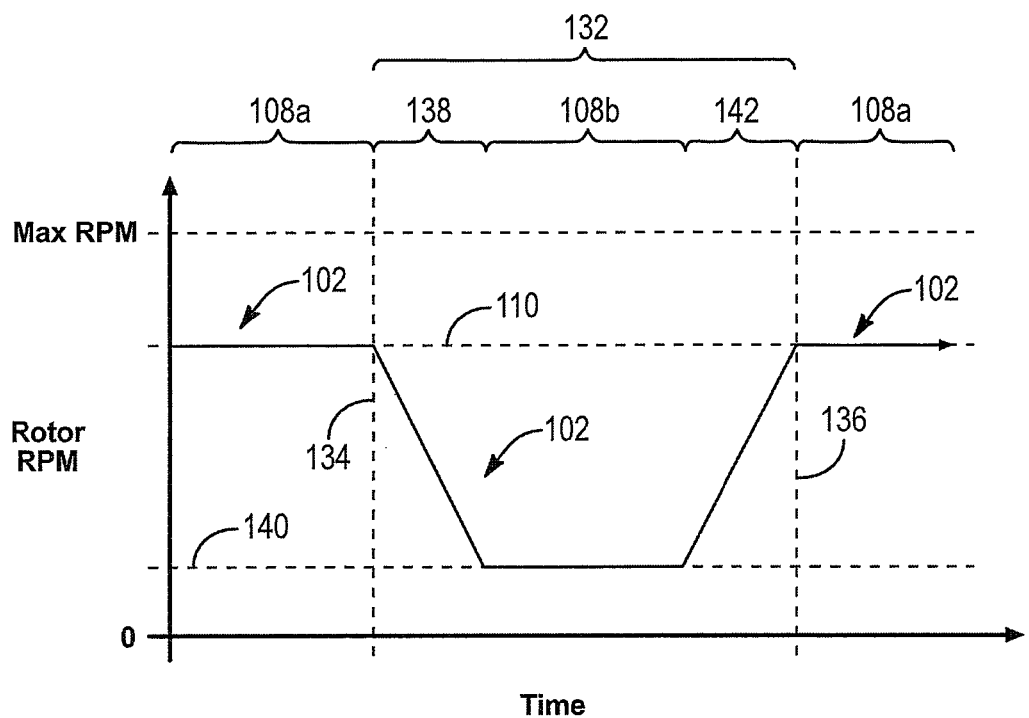
FIG. 11 is a schematic plot comparing rotor RPM versus time from autorotative cruise, through powered cruise, in accordance with the present invention, and back to autorotative cruise.

Referring to FIG. 11, criteria may be identified to characterize the capability or performance of a rotorcraft 10. For example, a rotorcraft 10 may be characterized in terms of maximum cruise speed, range, payload, and the like. Selected embodiments of rotorcraft 10 in accordance with the present invention may meet criteria previously unobtainable. Specifically, selected rotorcraft 10 may provide vertical takeoff and landing (VTOL), a disk loading of less than eight pounds per square foot, a cruise speed of at least 300 miles per hour, an empty to gross weight ratio of less than 0.55, a range of 1,000 nautical miles, a payload of over 1,000 pounds, and a noise profile equal to or better than that of a helicopter of equal gross weight.

VTOL may be provided by a prerotation system 82 in accordance with the present invention. A pre-flight spin up 100 provided by a prerotation system 82 may enable a jump take-off. That is, a rotor 40 is spun up 100 on the ground with a prerotation system 82 to store sufficient kinetic energy allowing a jump take-off. After the jump take-off, the rotor 40 may be trimmed in an autorotative state, while forward propulsion may be provided by one or more propellers, fans, jet engines, or combinations thereof. Additionally, a pre-landing, in-flight spin up 128 provided by a prerotation system 82 or some other means (e.g., in-flight maneuvers) may provide a landing with substantially no forward roll.

Such embodiments may provide a very good empty to gross weight ratio (e.g., a ratio of less than or equal to 0.55) as two systems required by a conventional helicopter are not needed. Specifically, rotorcraft 10 in accordance with the present invention may avoid a main rotor power transmission and an anti-torque system (usually requiring a power take-off, drive shaft, one or more intermediate gear boxes, and anti-torque rotor or fan). Instead, rotorcraft 10 in accordance with the present invention may include a prerotation system 82 (e.g., a low power, prerotation system), one or more propellers or other propulsion devices, and a wing 14.

To enable high speed flight, the rotor 40 of a rotorcraft 10 may be unloaded gradually when advance ratios exceed approximately 0.45. Speeds in excess of 250 miles per hour may require a slowing of the rotational speed of the rotor 40 to avoid excessive blade tip speed (e.g., Mach numbers greater than about 0.85) on the advancing side of the rotor 40. The end result may be an advance ratio of well over two when speeds approach 300 miles per hour.

At such high advance ratios, autorotation is theoretically possible. However, the operating angle of attack 78 of the rotor disk must be maintained within a very narrow operating range, leaving a small margin. This small margin may make control of rotor RPM extremely difficult in any conditions but perfectly smooth air. Additionally, the rotor 40 must continue to provide some lift 122 in order for autorotation to be possible. This may cause increased rotor loads and may result in unwanted vibrations.

To overcome the problems of high speed autorotation, rotorcraft 10 in accordance with the present invention may transition to powered rotation during high speed flight (e.g., airspeeds of about 250 miles per hour and above). In selected embodiments, a prerotation system 82 may be used to power the rotation of the rotor 40 at such speeds. When powered, the rotor 40 may be completely unloaded (e.g., provide no lift to support the weight of the rotorcraft 10). Accordingly, one or more wings 14 or any other fixed lifting surfaces may support the entire weight of the rotorcraft 10.

Once engaged, the prerotation system 82 may maintain rotor RPM at a desired level. To provide the desired or required control over the rotational speed of a rotor 40, a prerotation system 82 may be include an RPM adapter enabling an optimal rotor RPM to be maintained by the power plant (e.g., engine 48) operating at a cruise RPM. In selected embodiments, an RPM adapter may comprise a continuously variable transmission, such as one formed by a belt 88 riding between two, variable, V pulleys 84, 90. Accordingly, the same mechanisms 84, 88, 90, 92, 94, 96, 98 or subsystems enabling prerotation 100 and pre-landing, in-flight spin up 128 (speed increase 128) may also enable powering and RPM control at high airspeeds.

Under power, the system may transition a rotor 40 rapidly through resonance conditions. Additionally, the power transfer through a prerotation system 82 may be in either direction (e.g, from engine 48 to rotor 40, or from rotor 40 to engine 48). In certain embodiments, this may be accomplished by selectively manipulating a pawl clutch 98. For example, one or more actuators may transition a pawl clutch 98 to a mode or configuration wherein the input and output are locked together in unitary rotation.

Accordingly, a prerotation system 82 may prevent unacceptable variations in rotor RPM, even when entering autorotation. This may remove the need for sophisticated and quick re-trimming of the rotorcraft 10 to change the apportionment of lift between a rotor 40 and wing 14 using both cyclic and fixed wing controls.

In-flight powering of a rotor 40 in accordance with the present invention may be accomplished without an anti-torque system (e.g., without a tail rotor or the like found on helicopters). That is, a prerotation system 82 may power a rotor 40 to facilitate high speed flight. In high speed flight, there is a significant flow of air over the control surfaces (e.g., vertical stabilizers 20, rudder 22, and the like) of the rotorcraft 10. Accordingly, such surfaces may be easily operated to counteract any reactive torque produced by a prerotation system 82.

In certain embodiments, high speed flight in a rotorcraft 10 in accordance with the present invention may comprise a complete conversion from the low speed helicopter-type controls (e.g., cyclic and collective) to conventional fixed wing controls (e.g., ailerons 36, rudder 22, and elevator 30). Accordingly, cyclic and collective pitch controls may be left in a fixed position during high speed, level flight. However, during high speed maneuvers, cyclic controls may be used to maintain a rotor 40 in an unloaded condition. This may leave the wings 14 to support all loads (e.g., positive and negative g-loads).

In selected embodiments, cruise flight 108 of a rotorcraft 10 may comprise one or both of autorotative cruise 108a and powered cruise 108b. In autorotative cruise 108a, a rotor 40 may autorotate and support at least some portion of the weight of the rotorcraft 10. In powered cruise 108b, a rotor 40 may be powered (e.g., such as by a prerotation system 82) and support substantially no portion of the weight of the rotorcraft 10. Powered cruise 108b may correspond to an airspeed greater than the airspeed corresponding to autorotative cruise 108a. In certain embodiments, powered cruise 108b may correspond to airspeeds of about 250 miles per hour and greater.

Powered cruise 108b may be subset of powered flight 132. Powered flight 132 may include a portion of time in flight where a rotor 40 of a rotorcraft 10 is at least partially powered (i.e., is not rotated exclusively in autorotation). Accordingly, in selected embodiments, powered flight 132 may begin with the engagement 134 of a prerotation system 82 operating to turn a rotor 40 and end with the disengagement 136 of the prerotation system 82 from the rotor 40.

In the transition from autorotative cruise 108a to powered cruise 108b, a prerotation system 82 may decrease the rotational speed of a rotor 40. Accordingly, powered flight 132 may include an initial portion 138 wherein the rotor RPM may be reduced from one value of cruise RPM 110 associated with autorotative cruise 108a to another value of cruise RPM 140 associated with powered cruise 180b.

Conversely, in the transition from powered cruise 108b to autorotative cruise 108a, a prerotation system 82 may increase the rotational speed of a rotor 40. Accordingly, powered flight 132 may conclude with a final portion 142 wherein the value of rotor RPM is increased from the cruise RPM 140 associated with powered cruise 108b to another value of cruise RPM 110 associated with autorotative cruise 180a.

The numeric value of cruise RPM 140 associated with powered cruise 108b may vary with several factors. Such factors may include the length of the various rotor blades 42, weight of the various rotor blades 42, airspeed associated with powered cruise 108b, resonant frequencies associated with the rotor 40, and the like. For example, a rotor 40 with longer blades 42 may have a lower cruise RPM 140, thereby preventing the tips on the advancing blades 42 from reaching too great an airspeed (e.g., Mach numbers greater than about 0.85).

Figure 12:
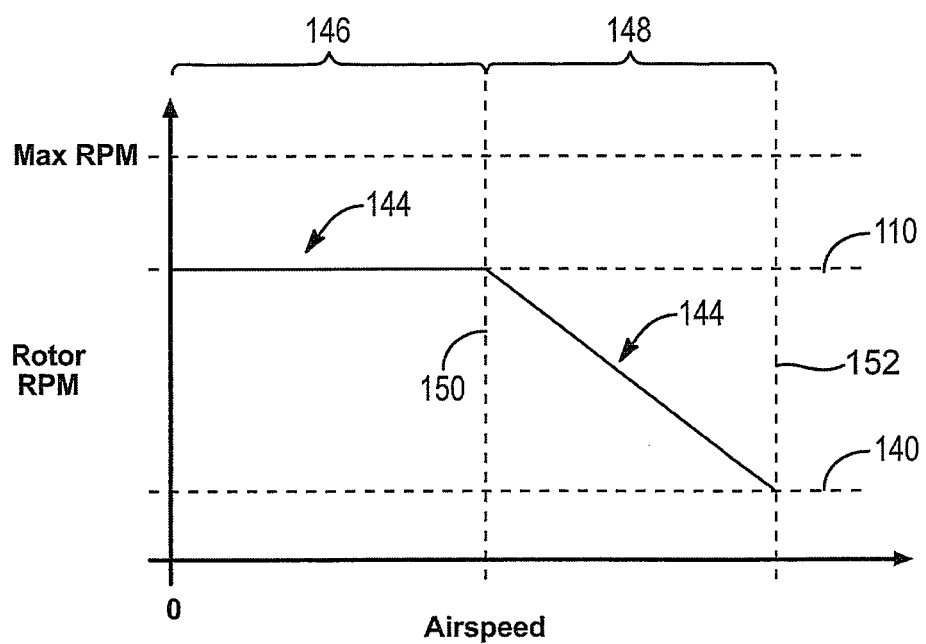
FIG. 12 is a schematic plot comparing rotor RPM versus airspeed across the transition from autorotative flight to powered flight.

Referring to FIG. 12, a plot 144 schematically graphs rotor RPM against airspeed. Such a plot 144 may be divided into two portions 146, 148. A first portion 146 corresponds to airspeeds ranging from about zero to a transition airspeed 150. A second portion 148 corresponds to airspeeds ranging from the transition air speed 150 up to a maximum airspeed 152 (e.g., the airspeed associated with powered cruise 108b).

The numerical value of the transition airspeed 150 may vary been rotorcraft 10 of different configurations. In general, the transition airspeed 150 may be an airspeed where the wings 14 and any other fixed lifting surfaces of a rotorcraft 10 are able to support the entire weight of the rotorcraft 10. They must do so while producing an induced drag that is not overly taxing on the one or more powerplants 48 providing forward propulsion. The induced drag needs to be established at a value that may be efficiently and cost effectively overcome by the one or more powerplants 48.

In selected embodiments and applications, rotor RPM may be steady from a low airspeed up to about the transition airspeed 150. However, once the transition airspeed 150 has been reached, the rotorcraft 10 has transitioned out of autorotative flight 108a and into powered flight 132. Now the rotor RPM may decrease. In general, greater airspeed may be accompanied by a reduction in rotor RPM. This is to prevent the tips on the advancing blades 42 from reaching too great an airspeed. Accordingly, a rotor 40 may continue to slow in rotational speed until the rotorcraft 10 reaches its maximum airspeed 152.

During the time a rotorcraft 10 is traveling at its maximum airspeed 152, the rotor 40 may be held steady at a value of cruise RPM 140 associated with powered cruise 108b. However, as the airspeed of a rotorcraft 10 slows, the rotor RPM may increase. This may continue until the rotorcraft 10 is flying at an airspeed compatible with autorotative flight. At that point, a prerotation system 82 may be disengaged, transitioning (e.g., returning) the rotorcraft 10 to autorotative flight.

Figure 13:
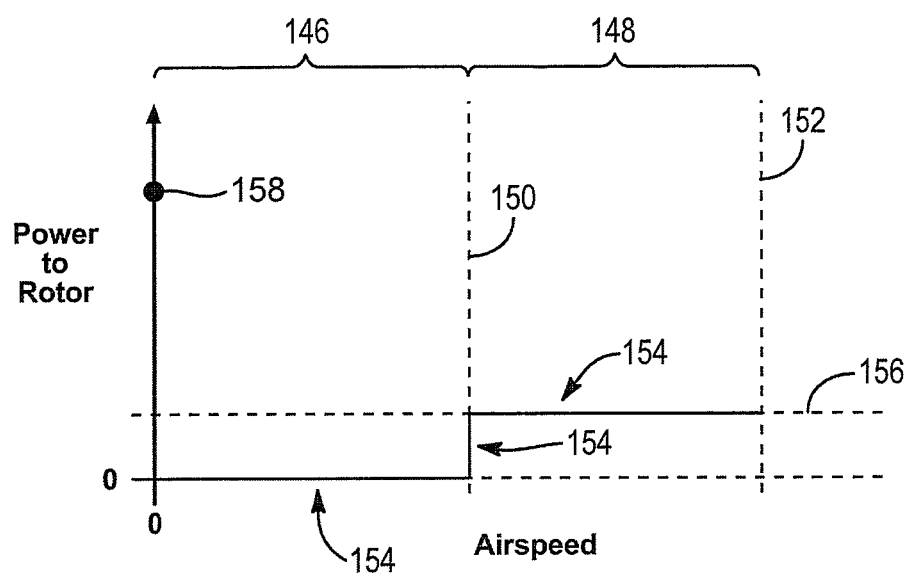
FIG. 13 is a schematic plot comparing power applied to a rotor versus airspeed across the transition from autorotative flight to powered flight.

Referring to FIG. 13, a plot 154 schematically graphs the power applied to a rotor 40 versus airspeed. As with other plots 102, 130, 144 discussed herein, this plot 154 is intended only as illustrative and may be affected by many factors and inputs affecting rotorcraft performance and behavior. For example, the plot 154 does not include a pre-landing spin up 128, which may be included within high speed flight in accordance with the present invention. Accordingly, like the other plots 102, 130, 144, this plot 154 is not intended to limit the scope of the invention.

The power 156 required to rotate a rotor 40 during powered flight 132 (i.e, during the second portion 148) may be a comparatively small fraction of the available power capability of the prerotation system 82. For example, the power 156 required during powered flight 132 may be significantly less than the power 158 required for pre-flight prerotation 100. Accordingly, a prerotation system 82 in accordance with the present invention may be configured to provide one or more of short term, high power output during prerotation 100, short term, high power output during pre-landing spin up 128, and long term, low power output during high speed cruise 108b.

The present invention may be embodied in other specific forms without departing from its essential characteristics. The described embodiments are to be considered in all respects only as illustrative, and not restrictive. The scope of the invention is, therefore, indicated by the appended claims, rather than by the foregoing description. All changes which come within the meaning and range of equivalency of the claims are to be embraced within their scope.

What is claimed and desired to be secured by United States Letters Patent is:

1. A method enabling high speed flight in a rotorcraft, the method comprising:
   selecting a rotorcraft comprising at least one engine, a rotor, and at least one fixed wing surface;
   executing, by the rotorcraft, a flight comprising a first portion and a second portion;
   flying, during the entire first portion, the rotorcraft with the rotor exclusively in autorotation;
   flying, during at least a portion of the first portion, the rotorcraft with substantially all weight of the rotorcraft supported by the rotor;
   flying, during the entire second portion, the rotorcraft with rotation of the rotor being powered at least partially by the at least one engine; and
   flying, during at least a portion of the second portion, the rotorcraft with substantially all weight of the rotorcraft supported by the at least one fixed wing surface.

2. The method of claim 1, further comprising decreasing, during the second portion, the rotational speed of the rotor.

3. The method of claim 1, wherein the rotorcraft further comprises a prerotation system.

4. The method of claim 3, further comprising prerotating, by the at least one engine via the prerotation system, the rotor prior to the executing of the flight.

5. The method of claim 4, wherein the flying during the second portion comprises powering, by the at least one engine through the prerotation system, rotation of the rotor.

6. The method of claim 5, further comprising decreasing, during the second portion, the rotational speed of the rotor.

7. The method of claim 6, wherein the first portion precedes the second portion.

8. The method of claim 7, wherein the flight further comprises a third portion following the second portion.

9. The method of claim 8, further comprising flying, during the entire third portion, the rotorcraft with the rotor exclusively in autorotation.

10. The method of claim 9, further comprising flying, during at least a portion of the third portion, the rotorcraft with substantially all weight of the rotorcraft supported by the rotor.

11. A method enabling high speed flight in a rotorcraft, the method comprising:
   selecting a rotorcraft having a weight and comprising at least one engine, a rotor, and at least one fixed wing surface;
   executing, by the rotorcraft, a flight having an initial portion in which the weight of the rotorcraft is substantially supported by autorotation;
   obtaining, during the flight, a first airspeed sufficient for the at least one fixed wing surface to support the entire weight of the rotorcraft;
   supporting, by the at least one fixed wing surface after the obtaining, substantially all weight of the rotorcraft; and
   powering, by the at least one engine during the supporting, rotation of the rotor.

12. The method of claim 11, further comprising obtaining, during the supporting and powering, a second airspeed, greater than the first airspeed.

13. The method of claim 12, wherein the second airspeed is greater than 250 miles per hour.

14. The method of claim 11, further comprising slowing, during the supporting, the rotational speed of the rotor.

15. The method of claim 11, wherein the rotorcraft further comprises at least one control surface selected from the group consisting of a rudder, elevator, and aileron.

16. The method of claim 15, further comprising controlling the flight, during the supporting and powering, using the at least one control surface.

17. The method of claim 11, wherein the rotorcraft further comprises a prerotation system.

18. The method of claim 17, further comprising prerotating the rotor, by the at least one engine through the prerotation system, prior to the executing of the flight.

19. The method of claim 18, wherein the powering comprises urging rotation of the rotor, by the at least one engine, through the prerotation system.

20. A method comprising:
   selecting a rotorcraft having a weight and comprising at least one engine, a prerotation system, a rotor, and at least one fixed wing surface;
   prerotating the rotor, by the at least one engine, through the prerotation system;
   executing, by the rotorcraft, after the prerotating, a flight comprising a first portion, second portion, and third portion, the first portion immediately preceding the second portion, the second portion immediately preceding the third portion;
   flying, during the first portion, the rotorcraft with the rotor operating exclusively in autorotation;
   flying, during the second portion, the rotorcraft with substantially all of the weight supported by the at least one fixed wing surface and rotation of the rotor being powered substantially exclusively by the at least one engine via the prerotation system;
   decreasing, during the second portion, the rotational speed of the rotor;
   flying, during the third portion, the rotorcraft with the rotor exclusively in autorotation; and
   terminating simultaneously the flight and the third portion by landing the rotorcraft.

* * * * *